(12) United States Patent
Salter et al.

(10) Patent No.: US 8,330,385 B2
(45) Date of Patent: Dec. 11, 2012

(54) LIGHT BAR

(75) Inventors: Stuart C. Salter, White Lake, MI (US); Jeffrey Singer, Canton, MI (US); Denis Patrick Igoe, Livonia, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 403 days.

(21) Appl. No.: 12/705,681

(22) Filed: Feb. 15, 2010

(65) Prior Publication Data

US 2011/0198995 A1 Aug. 18, 2011

(51) Int. Cl.
*H05B 37/02* (2006.01)
*H05B 41/16* (2006.01)
*H01J 7/44* (2006.01)

(52) U.S. Cl. ............... 315/287; 315/57; 315/77; 315/80; 315/291; 200/310; 200/313; 200/314; 200/600; 362/487; 362/551; 362/552; 362/615; 362/631

(58) Field of Classification Search ............... 315/51, 315/287, 291, 77, 80; 200/5 R, 310, 313, 200/314, 600; 362/487, 488, 551, 552, 615, 362/631
See application file for complete search history.

(56) References Cited

U.S. PATENT DOCUMENTS

| | | | |
|---|---|---|---|
| 4,388,558 A * | 6/1983 | Mizuno et al. ................... | 315/77 |
| 5,696,483 A | 12/1997 | Khalid et al. | |
| 5,784,036 A * | 7/1998 | Higuchi et al. ................... | 345/7 |
| 6,629,716 B2 * | 10/2003 | Shibata et al. ................... | 296/70 |
| 6,667,563 B2 | 12/2003 | Bae et al. | |
| 7,136,051 B2 | 11/2006 | Hein et al. | |
| 7,221,359 B2 | 5/2007 | Hein et al. | |
| 7,301,284 B2 * | 11/2007 | Ito et al. ........................... | 315/82 |
| 7,315,005 B2 | 1/2008 | Cenedese | |
| 7,319,426 B2 * | 1/2008 | Garfio ............................ | 341/176 |
| 8,075,400 B2 * | 12/2011 | Matsuyama et al. ............. | 463/37 |
| 2008/0122661 A1 | 5/2008 | Han | |
| 2008/0202912 A1 * | 8/2008 | Boddie et al. .................. | 200/600 |
| 2009/0021380 A1 * | 1/2009 | Higuchi et al. ............. | 340/573.1 |
| 2009/0065336 A1 * | 3/2009 | Bayley et al. .................. | 200/313 |
| 2009/0090611 A1 | 4/2009 | Zeijlon et al. | |
| 2009/0108985 A1 | 4/2009 | Haag et al. | |
| 2009/0201577 A1 * | 8/2009 | LaPlante et al. ............... | 359/355 |
| 2010/0090612 A1 * | 4/2010 | Spartano ........................ | 315/287 |
| 2010/0282582 A1 * | 11/2010 | Fu .................................. | 200/314 |

OTHER PUBLICATIONS

3M Deutschland GmbH Automotive EBU, 3M Automotive Driven by Innovation. Worldwide, Fascinating Illumination: Precision Lighting Elements, Germany, 2007, pp. 1-2.
3M Engineered Lighting Solutions, 3M Precision Lighting Elements, Light Guides for Led'S, St. Paul, MN, 2008, pp. 1-3.

* cited by examiner

*Primary Examiner* — Douglas W Owens
*Assistant Examiner* — Thai Pham
(74) *Attorney, Agent, or Firm* — Frank A. MacKenzie; Brooks Kushman P.C.

(57) ABSTRACT

A light bar system for a vehicle compartment includes a circuit board having a plurality of capacitive-type, user-activated switches, an electrical power source coupled to the circuit board, a light emitting diode (LED) coupled to the circuit board, and a light bar affixed to the circuit board. The user-activated switches are coupled to a vehicle accessory to control the level of operation of the vehicle accessory. The most recently actuated one of the user-actuated switches is detected by the circuit board and the circuit board provides a pulse width modulated (PWM) signal to the LED with a duty cycle of the PWM signal based on the most recently actuated switch. A higher duty cycle PWM signal corresponds to a higher setting of the accessory.

20 Claims, 3 Drawing Sheets

LIGHT BAR

BACKGROUND

1. Technical Field

The present disclosure relates to a light bar for providing an indicator of user input.

2. Background Art

It is known to use indicators in automotive vehicles or associated with consumer electronics to provide feedback to a user of the vehicle or electronic device about the status of the device. In FIG. 1, an interior 8 of an automobile is shown. In addition to the gear selector, steering wheel, and turn signal stalks, the driver has many switches, control panels, knobs, etc. to control entertainment systems, climate control systems, navigation systems, etc. In one example shown in FIG. 2, a user input device 10 has six switches 12, 14, 16, 18, 20, and 22 that may correspond to off, 20% of max, 40% of max, 60% of max, 80% of max, and maximum, respectively. As an example, user input device 10 is a fan control. For the convenience of the operator of the vehicle, user input device 10 is provided with six light emitting diodes (LEDs) 24, 26, 28, 30, 32, and 34, corresponding with switches 12, 14, 16, 18, 20, and 22, respectively. As the operator depresses one of the switches, the corresponding light is illuminated to indicate to the operator that there attempt to depress the switch was successful and also to indicate which setting the fan control, or other control, is being commanded. Note that when a new switch is depressed, the prior switch is overridden or turned off, such that only one switch setting is accessed at any given time. Thus, only one LED is illuminated at any one time. In an alternative, if 60% of maximum fan speed is being requested by the user by depressing switch 18, the corresponding LED 30 is illuminated, as well as LEDs 28 and 26. Additionally, LED 24 associated with off can also be illuminated. In such an embodiment, the user sees a row, or column, of LEDs illuminated relating to the strength of the setting. In yet another embodiment, the LED 24, which indicates an off position, is a different color than LEDs 26, 28, 30, 32, and 34. Each of the systems described in relation to FIG. 2 requires one LED per switch. Furthermore, the panel into which the control/display system is installed is provided with openings for each switch and LED.

SUMMARY

A method to provide illumination to a light bar via a light emitting diode (LED) is disclosed in which power to the LED is controlled by a pulse width modulated (PWM) signal wherein a duty cycle of the PWM signal is based on a user input. The light bar is associated with a plurality of user-operated switches and the duty cycle of the PWM signal is based on a most recent switch activated by the user. The user-operated switches are arranged linearly from a first end to a second end with a switch located at the first end associated with a low duty cycle and a switch located at the second end associated with a high duty cycle and the switches in between associated with duty cycle of switches between first and second ends increasing monotonically from the low duty cycle to the high duty cycle. A frequency of the PWM signal is a frequency greater than a perception rate of a human so that a resulting illumination in the light bar appears as a continuous light source to the human. The LED emits light at a predetermined frequency and the light bar attenuates light at the predetermined frequency. The LED is placed proximate a first end of the light bar, the LED emits light at a predetermined frequency, and the light bar attenuates light at the predetermined frequency with the attenuation in the light bar being sufficient such that a human user perceives light emitted from the light bar at the first end being of higher intensity than light emitted from the light bar at a second end of the light bar.

Also disclosed is a light bar system installed a vehicle compartment, which includes a circuit board having a plurality of capacitive-type, user-activated switches arranged linearly, an electrical power source coupled to the circuit board, a light emitting diode (LED) coupled to the circuit board at one end of the switches, and a light bar affixed to the circuit board such that the light bar covers the switches and the light bar is located proximate the LED. The user-activated switches are coupled to a vehicle accessory. One of the user-actuated switches actuated by a user is detected by the circuit board. The circuit board provides a pulse width modulated (PWM) signal to the LED with a duty cycle of the PWM signal based on the one user-actuated switch actuated by the user. A surface nearest the circuit board is processed. The circuit board can be processed by etching or by an application process such as painting, hot-stamping or silk-screening. In an alternative embodiment, light entering the light bar is attenuated by particles within the light bar.

Also disclosed is a light bar system, including a circuit board having a plurality of switches arranged on one side of the circuit board, a light emitting diode (LED) electronically coupled to the circuit board and attached to the one side of the circuit board, and a light bar covering the switches and located proximate the LED wherein a modulated signal from the circuit board is provided to the LED.

A duty cycle of the signal is based on which one of the plurality of switches was most recently actuated. In one embodiment, the switches are capacitive-type switches. The system also includes an electrical power source coupled to the circuit board. In one embodiment, a surface of the light bar nearest the circuit board is processed to provide desired surface characteristics.

The plurality of switches comprise a discrete number of switches through which a user indicates a desired level of a user-controllable vehicle accessory and the switches are arranged such that a first switch associated with an end of the light bar proximate the LED corresponds to the vehicle accessory being at a lowest setting and a second switch farthest away from the end of the light bar proximate the LED corresponds to the vehicle accessory being at a highest setting. The user-controllable vehicle accessory is: a light on an instrument cluster, a light on a video screen, a climate-control fan, an audio system, or a temperature controller. This list of vehicle accessories to which the present disclosure can be applied is a non-exhaustive list. The light bar can be applied to any vehicle feature without departing from the scope of the disclosure.

When a switch closest the LED is the last-activated switch, a duty cycle of the PWM signal is 0% and when a switch farthest from the LED is the last-activated switch, the duty cycle of the PWM signal is 100%. In one embodiment, a diffuser is placed over the light bar.

DETAILED DESCRIPTION

As those of ordinary skill in the art will understand, various features of the embodiments illustrated and described with reference to any one of the Figures may be combined with features illustrated in one or more other Figures to produce alternative embodiments that are not explicitly illustrated and described. The combinations of features illustrated provide representative embodiments for typical applications. However, various combinations and modifications of the features consistent with the teachings of the present disclosure may be desired for particular applications or implementations. Those of ordinary skill in the art may recognize similar applications or implementations consistent with the present disclosure, e.g., ones in which components are arranged in a slightly different order than shown in the embodiments in the Figures. Those of ordinary skill in the art will recognize that the teachings of the present disclosure may be applied to other applications or implementations.

Figure 1:
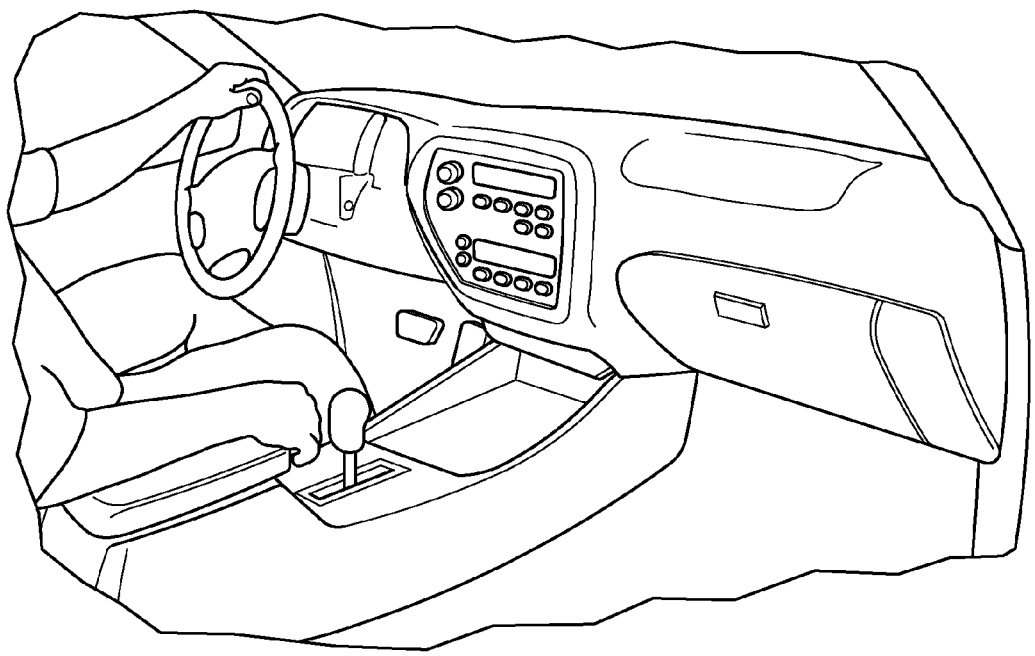
FIG. 1 is an interior view of an automobile.
Figure 2:
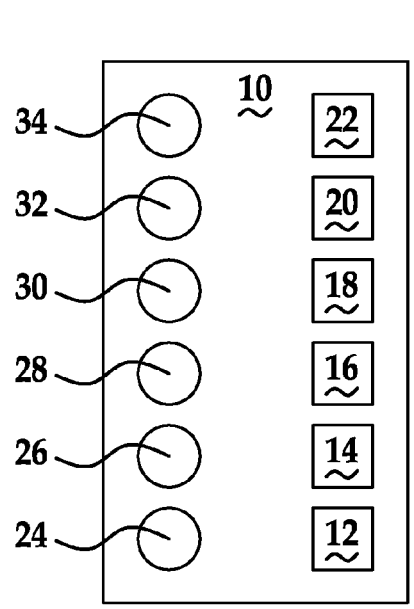
FIG. 2 is a plan view of a user input device having LEDs to indicate the user selection.
Figure 3:
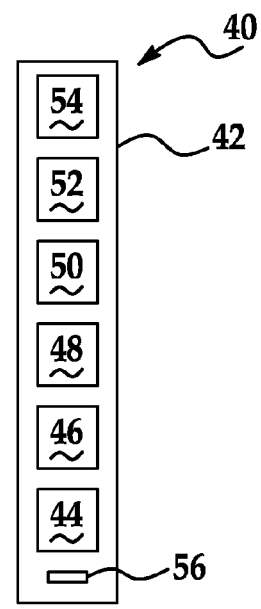
FIG. 3 is a plan view of a portion of a light bar system according to an embodiment of the disclosure.

In FIG. 3, a portion of a light bar system 40 according to an embodiment of the disclosure is shown. The light bar system includes a circuit board 42 with a plurality of switches 44, 46, 48, 50, 52, 54 coupled thereto. In one embodiment, switches 44, 46, 48, 50, 52, 54 are capacitive switches. Light bar system 40 also includes a LED 56 and a light bar (not shown in this view) over the top of switches 44, 46, 48, 50, 52, and 54. As is well known in the art, circuit board 42 includes electrical circuitry operative to 1) generate electrical signals in response to and correlated with actuation of the switches, and 2) use the electrical signals so generated to energize and illuminate LED 56. In one embodiment, LED 56 is a side-emitting LED such that light is directed in the direction of the switches towards the light bar that is not shown in this view. A first side of LED 56 is mounted on circuit board 42; light is emitted out of a second side of LED 56. In this embodiment, the first side of LED 56 is substantially perpendicular to the second side of LED 56, although other arrangements may be suitable for particular applications or implementations. Furthermore, any suitable light source/mounting system that provides light toward light bar 58 can be used. As shown in FIG. 3, switches 44, 46, 48, 50, 52, 54 are discrete switches located along a longitudinal axis of light bar system 40 with a space between switches. Alternatively, switches 44, 46, 48, 50, 52, and 54 are substantially contiguous so that the user can depress any location in the vicinity of the switches and activate one of the switches. The embodiment shown in FIG. 3 is not intended to be limiting, a greater or lesser number of switches can be used and still be within the scope of the present disclosure. In one embodiment, two switches are used: one for increasing the level of the vehicle accessory and one for decreasing the level of the vehicle accessory. In one embodiment, the level is increased based on a number of times that the increasing switch is depressed and in another embodiment, the level is increased based on a length of time that the increasing switch is depressed. In yet another embodiment, a single switch is provided. As the switch is actuated, either successively or continuously, the level of the vehicle accessory is increased to the maximum. If the switch continues to be actuated, the level switches back to a zero level (or minimum level) and then increases upon further actuation.

In one embodiment, switches 44, 46, 48, 50, 52, 54 are capacitive switches that react to a finger or other object touching the light bar in the vicinity, above the switches. The finger or other object alters the capacitance in the vicinity of the switches and the change in capacitance can be detected by scanning the capacitance of the switches sequentially, for example, or by other known methods. In an alternative embodiment, the light bar is sufficiently flexible so that a user can depress the top of the light bar to cause it to deflect and activate one of switches 44, 46, 48, 50, 52, 54. In yet another alternative, the plurality of switches is supplanted by a slider switch, in which the location of the finger, or other pointer, contacting the light bar system 40 is detected. Such an embodiment can provide a discrete position-dependent signal or an infinitely variable signal depending on the implementation.

Switches 44, 46, 48, 50, 52, 54 are shown to be arranged linearly within light bar system 40 in FIG. 3. However, this arrangement is a non-limiting example. The switches can be arranged in a circle, along a diagonal, or any other suitable arrangement.

Figure 4:
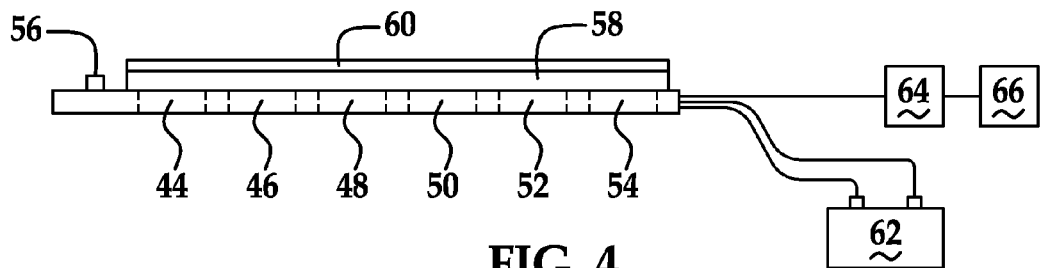
FIG. 4 is a side view of a light bar system according to an embodiment of the disclosure.

Referring now to FIG. 4, a side view of light bar system 40 shows the layers with a circuit board 42 having switches 44, 46, 48, 50, 52, 54 (shown in phantom) and LED 56. A light bar 58, is placed over the top of switches 44, 46, 48, 50, 52, 54. Light bar 58 may alternatively be called a light pipe or a light guide. In one embodiment, light bar 58 is affixed by an adhesive or a double-sided tape. In another embodiment, light bar 58 is held into place by brackets or the body panel into which light bar system 40 is mounted. Optionally, light bar system 40 may include a light diffuser 60 over light bar 58. Light diffuser 60 can be a translucent plastic or any other suitable material. In one embodiment, light diffuser 60 is printed or embossed with an image or printing for decorative or informative purposes.

Continuing to refer to FIG. 4, power is provided to circuit board 42 by a battery 62. Alternatively, power can be provided by any suitable electrical power source or provided from battery 62 via another device such as an electronic control unit (ECU) 64. In one embodiment, circuit board 42 is coupled to an ECU 64, which in turn, is coupled to a vehicle accessory 66 that is controlled by the switches. In one example, the controlled accessory 66 is a fan used to blow air into a passenger compartment of a vehicle. In another example, device 66 is a light coupled to an instrument panel. The accessory can be, for example: a light on an instrument cluster, a light on a video screen, a climate-control fan, an audio system, and a temperature controller. A variety of levels of light intensity in the instrument panel may be desired depending on the background illumination. In one embodiment, the switch last depressed or activated is communicated directly to ECU 64.

In an alternative embodiment, which can be described referring to FIG. 3, light bar 40 includes only two switches 44 and 54. In one embodiment, the user actuates switch 54 multiple times multiply increase the level at which the user-controllable vehicle accessory is commanded to operate. In an alternative or complementary embodiment, the user continues to touch switch 54 and the length of time that the user continues to actuate or touch switch 54 is interpreted to indicate a level of increase in operation level commanded to user-controllable vehicle accessory. To cause a decrease in level of operation of the user-controllable vehicle accessory, the user actuates switch 44 multiple times; or, in the other embodiment, the user continues to actuate switch 44 until the desired level in the user-controllable vehicle accessory is attained.

In yet another alternative, the user indicates a desire for an increased level of operation of the user-controllable vehicle accessory by actuates a single switch once and indicates a desire for a decrease by actuating a single switch twice in fairly quick succession. These are non-limiting examples. Any suitable user interface with one or more switches can be employed.

Figure 5:
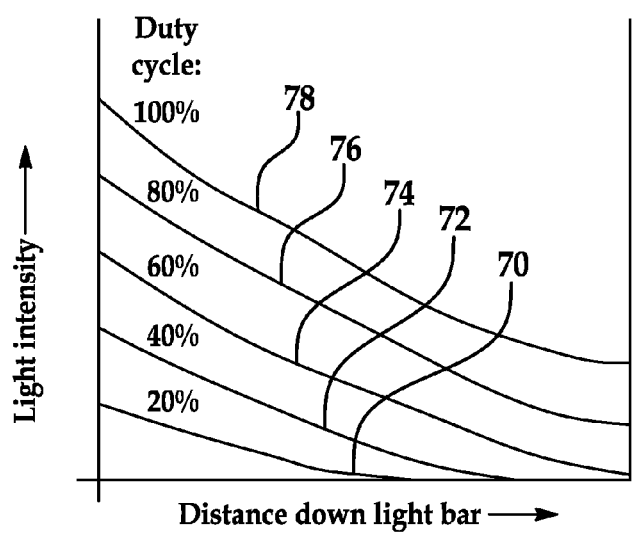
FIGS. 5-7 are graphs of light intensity emitted from the light bar as a function of distance along the light bar for a range of duty cycles for various light bars.

Light from LED 56 enters light bar 58, with the light guided to various exit surface locations of light bar 58. In one embodiment, light bar 58 contains particles within the material which disperse the light. In one example, light bar 58 is an acrylic material into which small beads are injected during production of the acrylic. Attenuation in light bar 58 depends on the properties of the beads, diameter of the beads, and the concentration of the beads. In FIG. 5, a graph of light emitted from surface 60 as a function of distance along light bar 58 is shown as a function of the duty cycle of a modulated signal provided to LED 56: 20% duty cycle 70, 40% duty cycle 72, 60% duty cycle 74, 80% duty cycle 76, and 100% duty cycle 78. As the user depresses a switch that activates a higher duty cycle than the prior switch, the light appears to brighten in light bar 58, in general, as well as moving along light bar 58 away from LED 56. Such behavior gives an appearance akin to a thermometer with the length illuminated increasing as a switch farther away from LED 56 is depressed. However, light bar 58 doesn't have a distinct interface between illuminated and non-illuminated sections. A linear range in duty cycle is shown in FIG. 5. Alternatively, a nonlinear range of duty cycles such as 6.25%, 12.5%, 25%, 50%, and 100% can be employed. These examples are not intended to be limiting; any combination of duty cycle settings can be employed. Furthermore, in one embodiment, the duty cycle settings are adjusted based on ambient light level in the interior of the vehicle so that the operator of the vehicle will notice a change in light level as a function of the switch that has been activated. Light bar 58 can be made of acrylic, other plastic material, glass, or any other suitable material.

Light from LED 56 enters light bar 58 and then exits surfaces of light bar 58, possibly after being reflected multiple times within light bar 58. The amount of light exiting at a particular section of the surface may be controlled using various techniques and in one embodiment light exiting at a particular section is related to the smoothness of the surface in that section. By etching the surface, the effective surface area increases, thereby causing more light to exit light bar 58 in the etched regions. The surface can be etched by laser, chemical, or mechanical processing. The surface can be processed by painting, hot-stamping, silk-screening or any other suitable methods to provide the desired surface characteristics. In yet another alternative, the light bar can be molded with the desired surface roughness. Similarly, various facets or other features may be used to direct light and control relative intensity of light exiting at a particular location.

Figure 6:
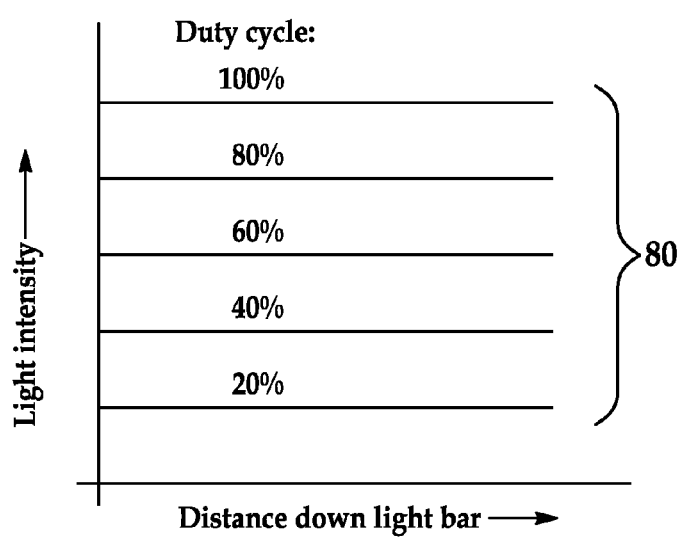

In FIG. 6, the result of etching the lower surface (surface nearest to the circuit board) with the etching being denser at the far end of light bar 58 is shown. The etching density on light bar 58 is a little less dense nearer LED 56 with the etching density increasing gradually so that light bar 58 emits substantially constant light along the light bar. In this embodiment, the intensity 80 of the light is primarily a function of the duty cycle of the driving signal.

Figure 7:
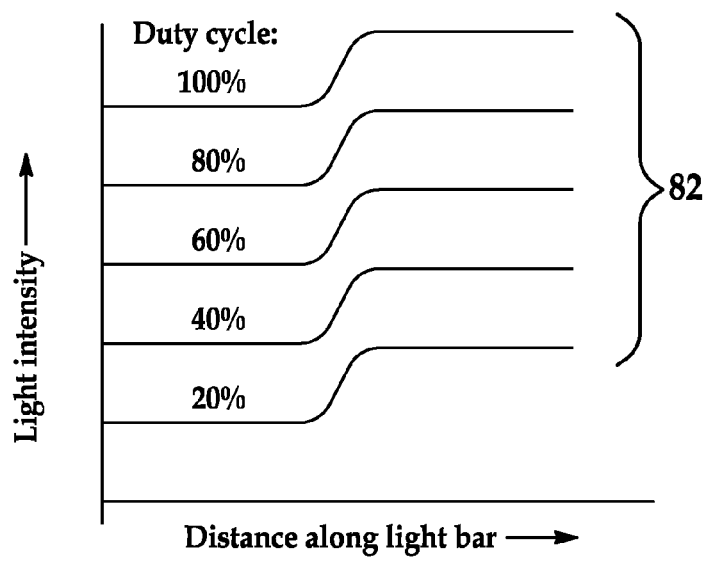

In FIG. 7, a light intensity family of curves 82 is shown in which the light intensity emitted from light bar 58 is greater at the far end of the bar. This can be provided by having little or no etching on light bar 58 at the end proximate LED 56 and a higher degree of etching on the distal end of light bar 58.

Figure 8:
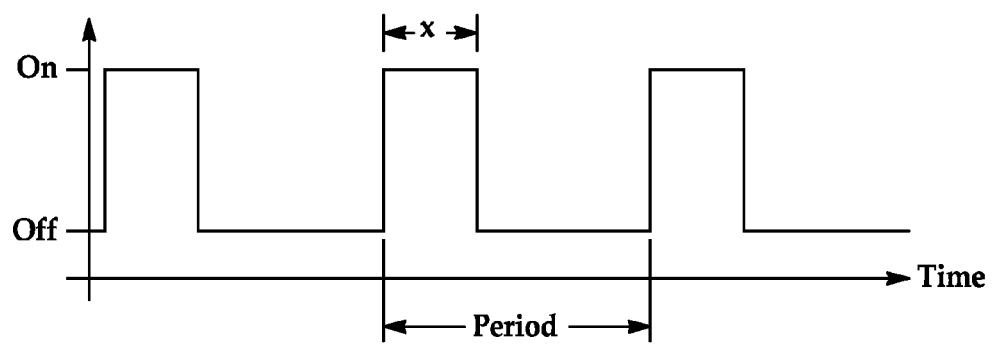
FIG. 8 is a generic pulse width modulated signal.

LED 56 is provided a pulse width modulated (PWM) signal at a carrier frequency with a particular duty cycle; a generic example is shown in FIG. 8. The frequency is the reciprocal of one period and the duty cycle is defined as (x/period)×100%. The duty cycle and/or PWM frequency of the driving signal should be selected based on the response of the load so that the human eye does not notice flicker. The actual duty cycle and frequency may vary by application and implementation. For example, in applications subject to vibration, the duty cycle and/or driving frequency may be increased to avoid discernible flicker. In one application, the driving signal frequency is about 3 kHz with duty cycle varied between 0-95%.

While the best mode has been described in detail, those familiar with the art will recognize various alternative designs and embodiments within the scope of the following claims. Where one or more embodiments have been described as providing advantages or being preferred over other embodiments and/or over prior art in regard to one or more desired characteristics, one of ordinary skill in the art will recognize that compromises may be made among various features to achieve desired system attributes, which may depend on the specific application or implementation. These attributes include, but are not limited to: cost, strength, durability, life cycle cost, marketability, appearance, packaging, size, serviceability, weight, manufacturability, ease of assembly, etc. The embodiments described as being less desirable relative to other embodiments with respect to one or more characteristics are not outside the scope of the disclosure as claimed.

What is claimed:

1. A light bar system, comprising:
    a circuit board having at least one switch arranged on one side thereof and electrical circuitry operative to generate electrical signals in response to actuation of the at least one switch;
    a light bar covering the at least one switch and having a first portion and a second portion; and
    a light emitting diode (LED) mounted to the circuit board closer to the first portion than to the second portion, the electrical signals illuminating the LED at alternative first and second intensities, the first intensity illuminating the first portion and not substantially illuminating the second portion, and the second intensity illuminating the first and the second portions.

2. The light bar system of claim 1 wherein the switch is a capacitive-type switch.

3. The light bar system of claim 1 wherein the circuit board has a plurality of switches and selection between the first and second LED illumination levels is based on which one of the plurality of switches was most recently actuated.

4. The light bar system of claim 3 wherein the plurality of switches are arranged linearly and comprise a discrete number of switches through which a user indicates a desired level of a user-controllable vehicle accessory and the switches are arranged such that a switch nearest a first end of the light bar corresponds to the vehicle accessory being at a lowest setting and a switch farthest away from the first end of the light bar corresponds to the vehicle accessory being at a highest setting.

5. The light bar system of claim 4 wherein the user-controllable vehicle accessory is one of: a light on an instrument cluster; a light on a video screen; a climate-control fan; an audio system; a temperature controller and an ambient lighting system.

6. The light bar system of claim 4 wherein when the switch nearest the first end is the last-activated switch, the electrical signal illuminating the LED is a pulse width modulated signal having a duty cycle of less than 100% and when the switch farthest from the first end is the last-activated switch, the electrical signal illuminating the LED is a pulse width modulated signal having a duty cycle of 100%.

7. The light bar system of claim 3 wherein the plurality of switches are arranged linearly and the LED is located at one end of the plurality of the switches.

8. The light bar system of claim 1 wherein a surface of the light bar is processed by at least one of etching, painting, hot-stamping, silk-screening, and surface roughening to control amounts of light exiting the surface at particular locations.

9. The light bar system of claim 1 wherein the LED mounts on the circuit board at a first side of the LED and the LED emits light out of a second side of the LED, with the second side being approximately perpendicular with the first side.

10. The light bar system of claim 1 wherein the alternative first and second intensities of LED illumination are achieved by supplying a pulse width modulated signal to the LED, the signal having a relatively lower duty cycle to achieve the first intensity and a relatively higher duty cycle to achieve the second intensity.

11. The light bar system of claim 1 wherein at the second LED illumination level, the first surface location is illuminated more brightly than the second surface location.

12. A method of controlling an amount of a light bar that is visibly illuminated comprising:
mounting a LED adjacent to the light bar; and
varying a pulse width modulated (PWM) signal powering the LED between a first duty cycle and a second duty cycle greater than the first, the first duty cycle selected to light the LED at a first intensity sufficient to visibly illuminate only a first portion of the light bar relatively close to the LED, and the second duty cycle selected to light the LED at a second intensity sufficient to visibly illuminate the first portion and a second portion of the light bar farther from the LED than the first portion.

13. The method of claim 12 wherein the light bar is associated with a plurality of user-operated switches and the duty cycle of the PWM signal is based on a most recent switch activated by the user.

14. The method of claim 13 wherein the user-operated switches are arranged linearly from a first end to a second end with a switch located at the first end associated with a low duty cycle and a switch located at the second end associated with a high duty cycle and the switches in between associated with duty cycle of switches between first and second ends increasing monotonically from the low duty cycle to the high duty cycle.

15. The method of claim 12 wherein a frequency of the PWM signal is a frequency greater than a perception rate of a human eye so that a resulting illumination in the light bar appears as a continuous light source to the human eye.

16. The method of claim 12 wherein the LED emits light at a predetermined frequency and the light bar attenuates light at the predetermined frequency.

17. The method of claim 12 wherein the LED is placed proximate a first end of the light bar, the LED emits light at a predetermined frequency, and the light bar attenuates light at the predetermined frequency with the attenuation in the light bar being sufficient such that a human user perceives light emitted from the light bar at the first end being of higher intensity than light emitted from the light bar at a second end of the light bar.

18. A light bar system installed a vehicle compartment, comprising:
a circuit board having a plurality of capacitive-type, user-activated switches arranged linearly and electrical circuitry operative to generate electrical signals in response to actuation of the switches, the switches operatively coupled to a vehicle accessory;
an electrical power source coupled to the circuit board;
a light emitting diode (LED) coupled to the circuit board at one end of the switches;
a light bar affixed to the circuit board such that the light bar covers the switches, the light bar located proximate the LED, wherein:
actuation of a first of the switches causes the electrical circuitry to supply to the LED a pulse width modulated (PWM) signal having a first duty cycle selected to light the LED at a first intensity sufficient to visibly illuminate only a first portion of the light bar relatively close to the LED; and
actuation of a second of the switches causes the electrical circuitry to supply to the LED a PWM signal having a second duty cycle selected to light the LED at a second intensity sufficient to visibly illuminate the first portion and a second portion of the light bar farther from the LED than the first portion.

19. The light bar system of claim 18 wherein a surface nearest the circuit board is processed by at least one of: etching, painting, hot-stamping, silk-screening, and surface roughening.

20. The light bar system of claim 18 wherein the light bar comprises particles within the light bar attenuating light passing through the light bar.

* * * * *